United States Patent
Baek, IV et al.

(10) Patent No.: US 9,004,264 B2
(45) Date of Patent: Apr. 14, 2015

(54) EXTENDABLE CONVEYORS WITH MODULAR FRONT ENDS

(71) Applicants: Anders Stougaard Baek, IV, Aarhus C (DK); Allan Falk, Horsens (DK); Mads Oestergaard, Viby J (DK); Brian Bondegaard Nielsen, Horsens (DK)

(72) Inventors: Anders Stougaard Baek, IV, Aarhus C (DK); Allan Falk, Horsens (DK); Mads Oestergaard, Viby J (DK); Brian Bondegaard Nielsen, Horsens (DK)

(73) Assignee: Caljan Rite-Hite APS, Hasselager (DK)

( * ) Notice: Subject to any disclaimer, the term of this patent is extended or adjusted under 35 U.S.C. 154(b) by 19 days.

(21) Appl. No.: 13/782,740

(22) Filed: Mar. 1, 2013

(65) Prior Publication Data

US 2013/0228419 A1 Sep. 5, 2013

(30) Foreign Application Priority Data

Mar. 1, 2012 (EP) ..................................... 12001401

(51) Int. Cl.
*B65G 21/10* (2006.01)
*B65G 21/14* (2006.01)
*B65G 67/08* (2006.01)

(52) U.S. Cl.
CPC ................ *B65G 21/14* (2013.01); *B65G 67/08* (2013.01)

(58) Field of Classification Search
CPC ......... B65G 21/14; B65G 21/12; B65G 13/12
USPC .................. 198/588, 594, 595, 812
See application file for complete search history.

(56) References Cited

U.S. PATENT DOCUMENTS

| | | | |
|---|---|---|---|
| 2,721,645 | A | 10/1955 | Eberle |
| 3,837,510 | A | 9/1974 | McWilliams |
| 4,236,194 | A | 11/1980 | Norman |
| 4,281,955 | A | 8/1981 | McWilliams |
| 4,425,069 | A | 1/1984 | Saur et al. |
| 5,051,874 | A | 9/1991 | Guss |
| D353,701 | S | 12/1994 | Beavers et al. |
| D367,143 | S | 2/1996 | Sauber |
| 5,582,286 | A | 12/1996 | Kalm et al. |
| 6,092,911 | A | 7/2000 | Baker, III et al. |

(Continued)

FOREIGN PATENT DOCUMENTS

| | | |
|---|---|---|
| DE | 20202926 | 5/2002 |
| DE | 102010005267 | 7/2011 |

(Continued)

OTHER PUBLICATIONS

European Patent Office, "Communication Pursuant to Article 94(3) EPC," issued in connection with European patent application No. 12 001 399.0-1707, dated Apr. 30, 2014, 5 pages.

(Continued)

*Primary Examiner* — James R Bidwell
(74) *Attorney, Agent, or Firm* — Hanley, Flight & Zimmerman, LLC

(57) ABSTRACT

An extendable conveyor disclosed herein includes a base unit and a mechanically extendable section, which is adjustably positionable between a nested position within the base unit and an extended position telescoped forwardly from the base unit. The conveyor includes a conveying surface for conveying articles extending at least partially on an upper side of the mechanically extendable section. The mechanically extendable section is an outmost mechanically extendable section and the outmost mechanically extendable section has a modular front end portion which can carry a loading set and an unloading set.

18 Claims, 3 Drawing Sheets

(56) References Cited

U.S. PATENT DOCUMENTS

| | | |
|---|---|---|
| 6,484,862 B1 | 11/2002 | Gilmore et al. |
| 6,843,362 B2 | 1/2005 | Tachibana et al. |
| D572,875 S | 7/2008 | Ito et al. |
| D580,123 S | 11/2008 | Ito et al. |
| 7,537,101 B2 | 5/2009 | Aulanko et al. |
| 7,775,339 B2 | 8/2010 | Ogimura |
| 7,870,949 B2 | 1/2011 | Kanaris |
| 7,909,153 B2 | 3/2011 | Pogue |
| 7,983,821 B2 | 7/2011 | Reeves |
| 8,033,775 B2 | 10/2011 | Donelson et al. |
| 8,662,291 B2 * | 3/2014 | Henderson .................... 198/812 |
| 2003/0019714 A1 | 1/2003 | Shaw et al. |
| 2005/0087428 A1 | 4/2005 | Pelak et al. |
| 2006/0133913 A1 | 6/2006 | Helmner |
| 2008/0060386 A1 | 3/2008 | Kanno et al. |
| 2009/0277753 A1 | 11/2009 | Violle |
| 2010/0133214 A1 | 6/2010 | Evans |
| 2011/0005902 A1 | 1/2011 | Kobs et al. |
| 2013/0233676 A1 | 9/2013 | Baek, IV et al. |
| 2013/0299313 A1 | 11/2013 | Baek, IV et al. |

FOREIGN PATENT DOCUMENTS

| | | |
|---|---|---|
| DE | 102010033115 | 2/2012 |
| EP | 1568628 | 8/2005 |
| EP | 2003076 | 12/2008 |
| WO | 0208098 | 1/2002 |
| WO | 2006068443 | 6/2006 |

OTHER PUBLICATIONS

European Patent Office, "Communication Pursuant to Article 94(3) EPC," issued in connection with European patent application No. 12 001 401.4-1707, dated Apr. 30, 2014, 5 pages.

European Patent Office, "Extended European Search Report," issued in connection with European application serial No. 12001401.4, mailed Aug. 3, 2012, 7 pages.

European Patent Office, "Extended European Search Report," issued in connection with European application serial No. 12001400.6, mailed Jul. 26, 2012, 7 pages.

European Patent Office, "Extended European Search Report," issued in connection with European application serial No. 12001399.0, mailed Aug. 2, 2012, 7 pages.

State Intellectual Property Office of P.R.China, "Notice of Granting Patent Right for Design," issued in connection with Chinese application serial No. 201230419164.X, issued Feb. 1, 2013, 4 pages.

United States Patent and Trademark Office, "Non-Final Office Action," issued in connection with U.S. Appl. No. 13/782,742, mailed May 30, 2014, 25 pages.

United States Patent and Trademark Office, "Office Action," issued in connection with U.S. Appl. No. 29/431,014, on Jul. 14, 2014 (6 pages).

The United States Patent and Trademark Office, "Non-Final Office Action," issued in connection with U.S. Appl. No. 13/782,744, dated Jan. 7, 2015, 39 pages.

The United States Patent and Trademark Office, "Corrected Notice of Allowability," issued in connection with U.S. Appl. No. 13/782,742, dated Jan. 7, 2015, 11 pages.

United States Patent and Trademark Office, "Notice of Allowance," issued in connection with U.S. Appl. No. 13/782,742, on Sep. 17, 2014 (17 pages).

United States Patent and Trademark Office, "Supplemental Notice of Allowance," issued in connection with U.S. Appl. No. 13/782,742, on Nov. 7, 2014 (8 pages).

The United States Patent and Trademark Office, "Notification of Reopening of Prosecution Due to Consideration of an Information Disclosure Statement Filed After Mailing of a Notice of Allowance," issued in connection with U.S. Appl. No. 13/782,742, dated Mar. 4, 2015 10 pages.

The United States Patent and Trademark Office, "Non-Final Office Action," issued in connection with U.S. Appl. No. 13/782,742, dated Mar. 4, 2015, 10 pages.

European Patent Office, "Decision to grant a European patent pursuant to Article 97(1) EPC," issued in connection with European Patent Application No. 12001400.6, dated Jan. 22, 2015, 1 page.

\* cited by examiner

EXTENDABLE CONVEYORS WITH MODULAR FRONT ENDS

FIELD OF THE INVENTION

This disclosure relates generally to conveyors and, more particularly, to extendable conveyors with modular front ends.

BACKGROUND OF THE INVENTION

The loading and unloading of packages from truck trailers or the like is typically a physically challenging task for which extendable conveyors are used.

Extendable conveyors, such as described in WO 2006/068443 A1 and DE 10 2010 005 267 A1, have a base unit and multiple extendable conveyor sections which are nested within each other. The total length of the extendable conveyor can be adjusted by extending or retracting the nested extendable conveyor sections. The end of the extendable conveyor, (e.g., the outmost extendable conveyor section), can move, for example, into a truck at a loading dock for loading or unloading goods. Such known extendable conveyors usually have a control panel at the front end of the extendable conveyor for controlling the conveyor.

The control panel at the front end typically allows control of the extendable conveyor, in particular to start and stop conveying of articles in order to load or unload articles, e.g. from a truck. However, the loading and unloading situation may differ from each other, since it makes a difference whether an article is picked up from the conveyor (e.g., a loading situation), or whether an article is put onto the conveyor (e.g., an unloading situation).

DETAILED DESCRIPTION

Figure 1:
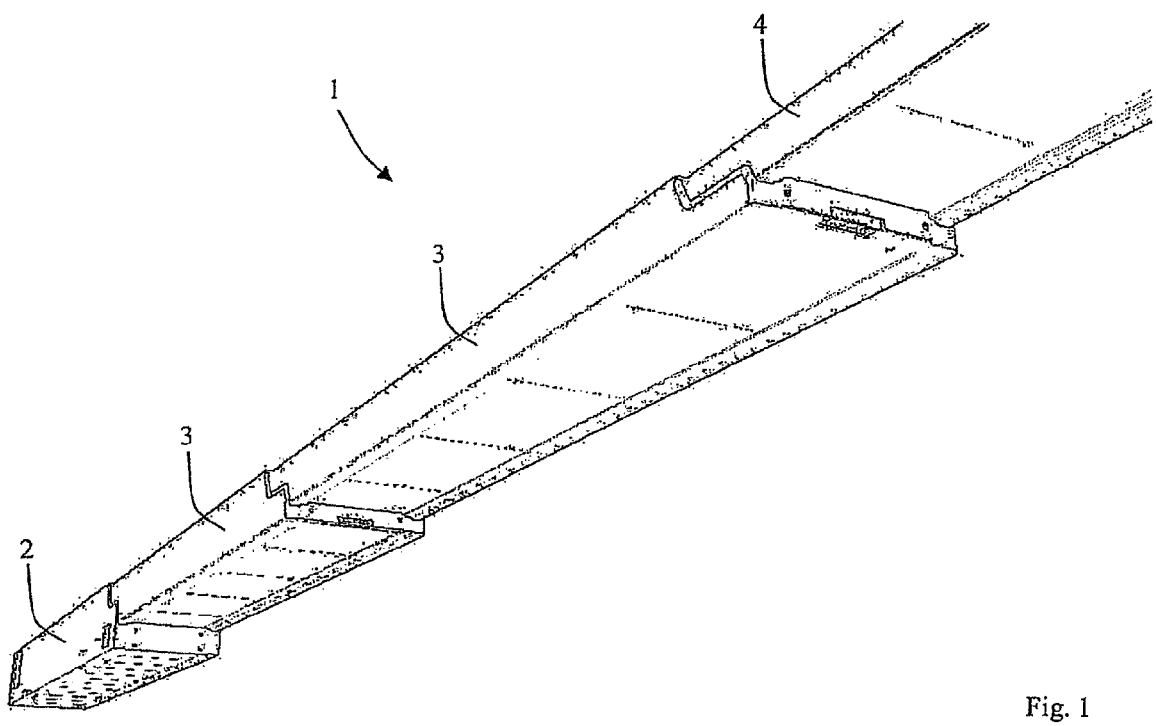
FIG. 1 illustrates an example extendable conveyor constructed in accordance with the teachings disclosed herein.

FIG. 1 illustrates an example extendable conveyor 1 constructed in accordance with the teachings disclosed herein.

As mentioned in the outset, extendable conveyors such as, for example, extendable conveyors described in WO 2006/068443 A1 and DE 10 2010 005 267 A1, have a base unit and multiple extendable conveyor sections which are nested within each other. The total length of the extendable conveyor can be adjusted by extending or retracting the nested extendable conveyor sections. The end of the extendable conveyor, (e.g., the outmost extendable conveyor section) can move, for example, into a truck at a loading dock for loading or unloading goods. Such known extendable conveyors usually have a control panel at the front end of the extendable conveyor for controlling the conveyor.

The control panel at the front end typically allows control of the extendable conveyor, in particular to start and stop conveying of articles, in order to load or unload articles, e.g. from a truck. As discussed, the loading and unloading situation may differ from each other, since it makes a difference whether an article is picked up from the conveyor (e.g., a loading situation), or whether an article is put onto the conveyor (e.g., an unloading situation).

The inventors have recognized that, due to the uncomfortable environment typically surrounding the working area of an extendable conveyor, it might be difficult in future to attract people to work in the (un)loading zone at the extendable conveyor. Moreover, (un)loading zones are typically cramped and hazardous and, thus, the risk that personnel get hurt is high.

The inventors have also recognized that the comfort for personnel loading and unloading articles can be improved when the extendable conveyor includes at its end a modular front end portion which is selectively configurable to incorporate a loading set or an unloading set.

In some examples, an extendable conveyor for conveying articles comprises a base unit and at least one mechanically extendable section, which is adjustably positionable between a retracted position fully or partially nested within the base unit and an extended position fully or partially telescoped forwardly from the base unit.

In some examples, the base unit is configured to be moveable on the floor in the direction of the mechanically extendable sections and/or transversely to this direction.

The extendable conveyor comprises a conveying surface for conveying articles. The conveying surface extends at least partially on an upper side of the at least one mechanically extendable section. In some examples the conveying surface also extends on the base unit. As known to the skilled person, the conveying surface can be formed by a belt and/or multiple rollers. In the case of an extendable roller conveyor, in some examples, the conveyor is inclined during unloading such that articles are conveyed in the direction of the base unit due to gravitation force.

In some examples, the extendable conveyor comprises two or more mechanically extendable sections, which are nested within each other and are disposed in a telescopic manner, such that they are adjustably positionable between a retracted position fully or partially nested within the base unit and an extended position fully or partially telescoped forwardly from the base unit. The last mechanically extendable section at the end opposite to the base unit is also referred to as the outmost mechanically extendable section in the following (or "outmost section"). The mechanically extendable sections between the base unit and the outmost mechanically extendable section are also referred to as intermediate mechanically extendable sections (or "intermediate section"). In examples where the extendable conveyor only comprises one mechanically extendable section, the "intermediate" and the "outmost" mechanically extendable section are the same.

For example, the mechanically extendable sections can be moved via a motor drive located in the base unit or any other mechanically extendable section via, for example, drive chains, wire ropes, (timing) belts, and/or the like, interconnecting the sections with each other such that all mechanically extendable sections can perform a telescopic movement by driving the motor drive accordingly. The telescopic movement mechanic of an extendable conveyor is generally known to the skilled person.

In the examples, the outmost mechanically extendable section includes a modular front end portion which is selectively configurable to incorporate a loading set or an unloading set.

The front end portion is located at the front end of the outmost section where loading and unloading of articles is done.

The construction of the front end portion is modular such that it can be configured or modified by configuring it with a respective loading set or unloading set. The loading set or unloading set each comprises at least one component which is adapted to configure the modular front end portion for use in loading or unloading of articles.

In some examples, the modular front end portion is also interchangeable.

In some examples, the modular front end portion comprises the loading set and/or unloading set. For example, the manufacturer of the extendable conveyor includes the loading set and/or unloading set. In other examples, the loading set and/or unloading set can be obtained from a third party.

The term "loading" as defined herein refers to, for example, loading of a container, while the term "unloading" as defined herein refers to, for example, unloading of a container. Thus, during "loading", the conveying surface transports articles in direction to the outmost mechanically extendable section, and during "unloading" the conveying surface transports articles from the outmost mechanically extendable section. Thus, during "loading", for example, personnel, picks up articles from the end of the outmost mechanically extendable section, while during "unloading", for example, personnel puts articles onto the end of the outmost mechanically extendable section.

In some examples, the loading set includes at least one of a loading plate, a debris tub, and/or at least one roller. During loading, articles which are conveyed by the conveying surface to the outmost section are picked up by personnel for loading, e.g., into a container or truck. In order to make the pickup procedure more comfortable, the loading set comprises a loading plate which is located at the outmost end of the outmost section. The conveying surface ends adjacent (e.g., before) the loading plate such that articles conveyed to the loading plate are stopped by the loading plate and typically will stay on the loading plate until the article is picked up.

In some examples, the at least one roller is located between the end of the conveying surface and the loading plate. Thus, an article which is conveyed by the conveying surface will roll over or cross the at least one roller and onto the loading plate. Thus, in this case, the at least one roller decelerates the articles.

In some examples, the debris tub is positioned underneath the at least one roller such that dust and other dirt falls down through a space surrounding the roller into the debris tub, thereby preventing or substantially reducing contamination to the inner portion of the modular front end portion.

In some examples, the unloading set includes at least one of a front plate and/or a shock absorbing system.

In some examples, the conveying surface is differently configurable for loading and unloading. The conveying surface is configurable such that it ends spaced apart from the end of the outmost mechanically extendable section in a loading configuration of the modular front end portion and extends to the end of the outmost mechanically extendable section in an unloading configuration of the modular front end portion. For instance, during loading the conveying surface is configured such that it ends before the roller and/or before the loading plate, while during unloading the conveying surface is configured such that it extends to the end of the outmost section.

Thus, during unloading, the front plate of the modular front end portion can be located at the front of the outmost section in order to at least partially cover the end of the conveying surface to reduce the likelihood of (e.g., prevent), for example, personnel getting their fingers into parts of the conveying surface.

In some examples, the shock absorbing system is located or positioned below the conveying surface in order to absorb shock caused by (e.g., heavy) articles which are put or thrown onto the conveying surface during unloading. Typically, the shock absorbing system includes an absorption plate and damping or shock absorbing members, which are located below the absorption plate in order to absorb shocks caused by articles falling onto the shock absorbing system.

In some examples, the modular front end portion is configured to carry at least one side part including an input to control the extendable conveyor. The side part is connectable to the modular front end portion. The input can include, for example, at least one of a keyboard, a joystick, a navigation pad, and/or other inputs capable of controlling an extendable conveyor (e.g., controlling the conveying surface movement, the extension of the conveyor, lighting, etc.).

In some examples, the side part is configured to receive a multi-connector for connecting, for example, at least one of lighting, an air blower, a lift arrangement, etc. In some examples, the multi-connector has an electrical connection part for providing an electric connection, e.g. to the lighting or air blower connected to it and to supply power to the connected parts. In some examples, the multi-connector also has a mechanical connection part, where, for example, a lift arrangement (e.g., adapted to lift heavy articles) can be connected.

In some examples, the modular front end portion is configured to carry a safety bumper. The safety bumper can be connected to a front end portion of the front part of the modular front end portion in order to abut against an obstacle, such as a wall of a container to be loaded or unloaded. In some examples, the safety bumper is connected to a safety unit which is adapted to detect whether the safety bumper is abutting against an obstacle. In some examples, an extension movement of the extendable conveyor is automatically stopped upon detection of abutment. Such an obstacle can also be a person, such that injury of the person can be avoided by automatically stopping the movement of the conveyor.

In some examples, the modular front end portion comprises at least one side bar configured to carry at least parts of the loading set and/or unloading set.

In some examples, the conveying surface includes a belt that is guided over a reversing roller located in the modular front end portion, and the modular front end portion is configured to carry the reversing roller in a loading position and in an unloading position. As also mentioned above, in some examples, the conveying surface can be configured in a loading and unloading configuration, wherein the conveying surface extends nearer to the end of the modular front end portion, for example, nearer to the front of the outmost section in the unloading configuration than in the loading configuration. This can be achieved in some examples, by moving the reversing roller over which the belt is guided from a loading position to an unloading position next to the front of the outmost section.

Some examples pertain to an extendable belt conveyor for conveying articles, as also describe above. The belt conveyor comprises a base unit, at least one mechanically extendable section, which is adjustably positionable between a retracted position fully or partially nested within the base unit and an extended position fully or partially telescoped forwardly from the base unit. A conveying surface, including a belt for conveying articles, extends at least partially on an upper side of the at least one mechanically extendable section, as also described above. The at least one mechanically extendable section is an outmost mechanically extendable section including a modular front end portion. The belt is guided over a reversing roller located in the modular front end portion. The modular front end portion is selectively configurable to carry the reversing roller in a loading position or in an unloading position. The reversing roller is closer to the outmost end of the outmost mechanically extendable section in the unloading position than in the loading position. As also described above, in such examples, the belt is spaced apart from the end of the outmost mechanically extendable section in a loading configuration of the modular front end portion and extends to the end of the outmost mechanically extendable section in an unloading configuration of the modular front end portion. For instance, during loading the belt is configured to end before the roller and/or before the loading plate, while during unloading the belt is configured to extend to the end of the outmost section. The loading and unloading position is achieved in some examples by moving the reversing roller over which the belt is guided from the loading position to the unloading position next to the front of the outmost section.

In some examples of an extendable belt conveyor, the modular front end portion is selectively configurable to incorporate a loading set or an unloading set, as described above.

FIG. 1 illustrates an extendable conveyor 1 constructed in accordance with the teachings disclosed herein. The extendable conveyor 1 has a base unit 2 and multiple mechanically extendable sections 3, 4, namely intermediate sections 3 and an outermost section 4, which are mechanically extendable and which are nested within each other, as also explained above. In FIG. 1 the extendable conveyor 1 is shown in an extended position, where the mechanically extendable sections 3, 4 are telescopically extended. The mechanically extendable sections are supported or cantilevered by the next inwardly or rearwardly positioned extendable section and the base unit 2 and are nested within one another such that the sections can be retracted into the base unit 2 to a stored position, which minimizes interference with the floor space of a loading dock when the conveyor 1 is not in use.

A conveying surface in the form of a belt 6 (FIGS. 2 to 6) extends over all mechanically extendable sections 3, 4. The belt 6 is driven by a belt drive located in the base unit 2.

Figure 2:
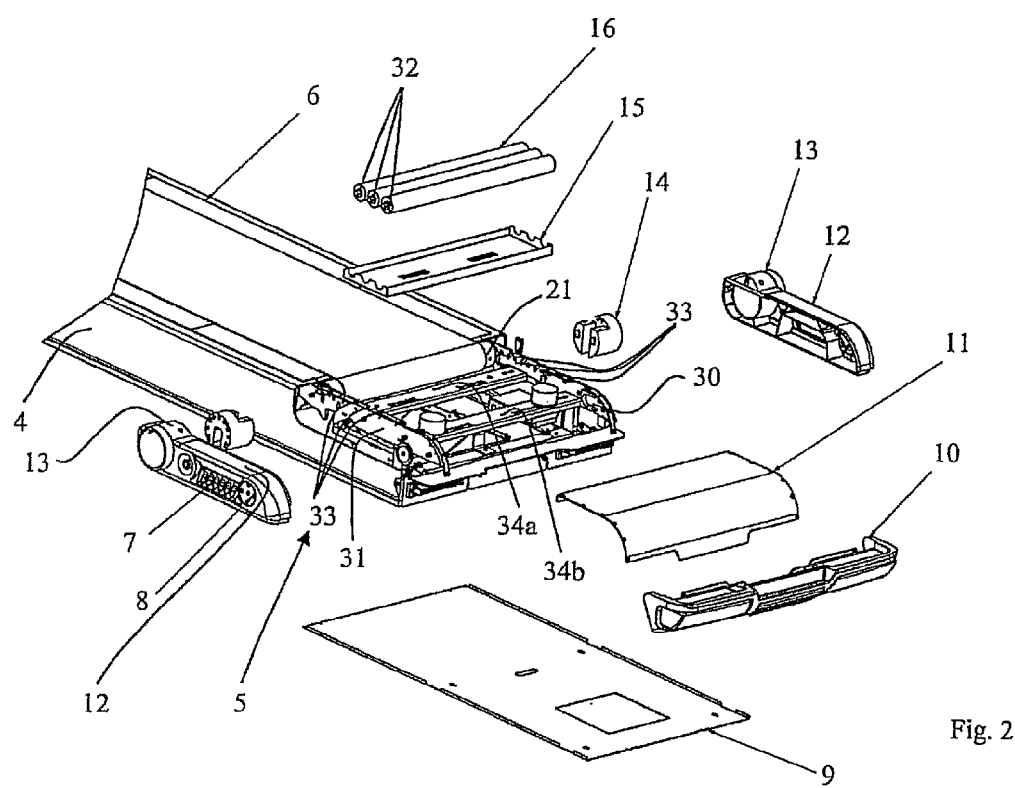
FIG. 2 is an exploded view of an example modular front end portion of the extendable conveyor of FIG. 1 shown in a loading configuration.
Figure 3:
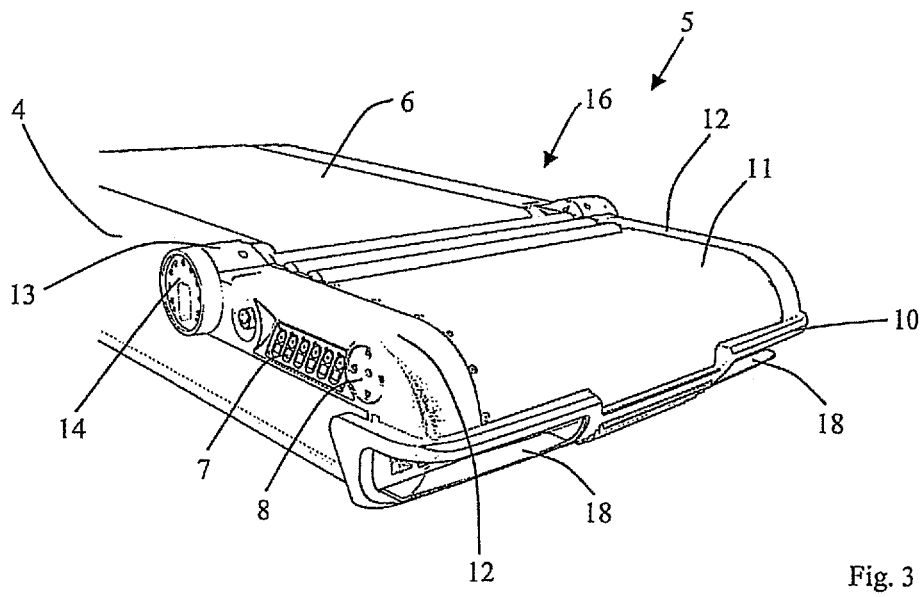
FIG. 3 is a perspective view of the modular front end portion of FIG. 2 in the loading configuration.
Figure 4:
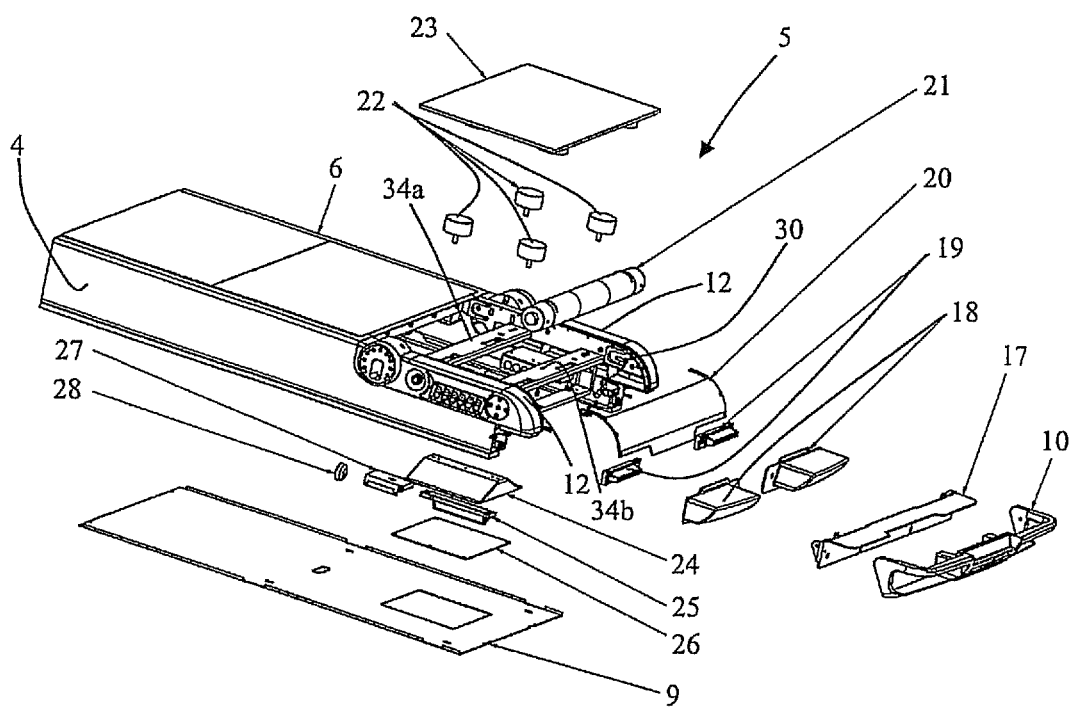
FIG. 4 is an exploded view of the modular front end portion of FIGS. 2 and 3 in an unloading configuration.
Figure 5:
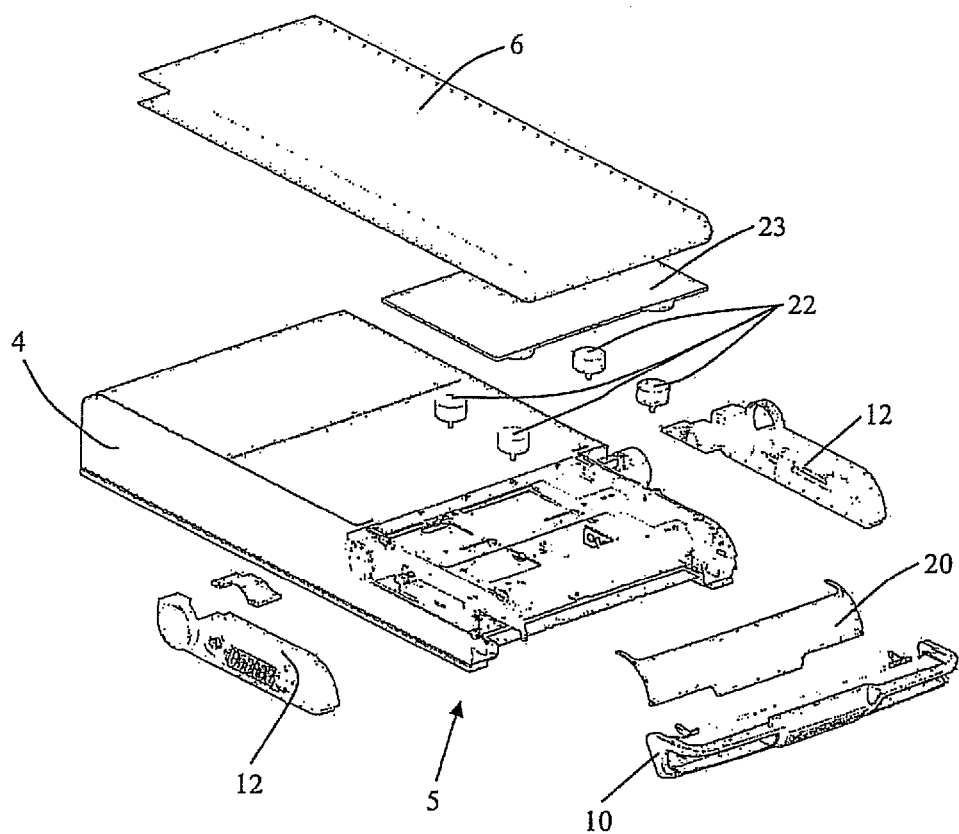
FIG. 5 is another exploded view the modular front end portion in the unloading configuration.
Figure 6:
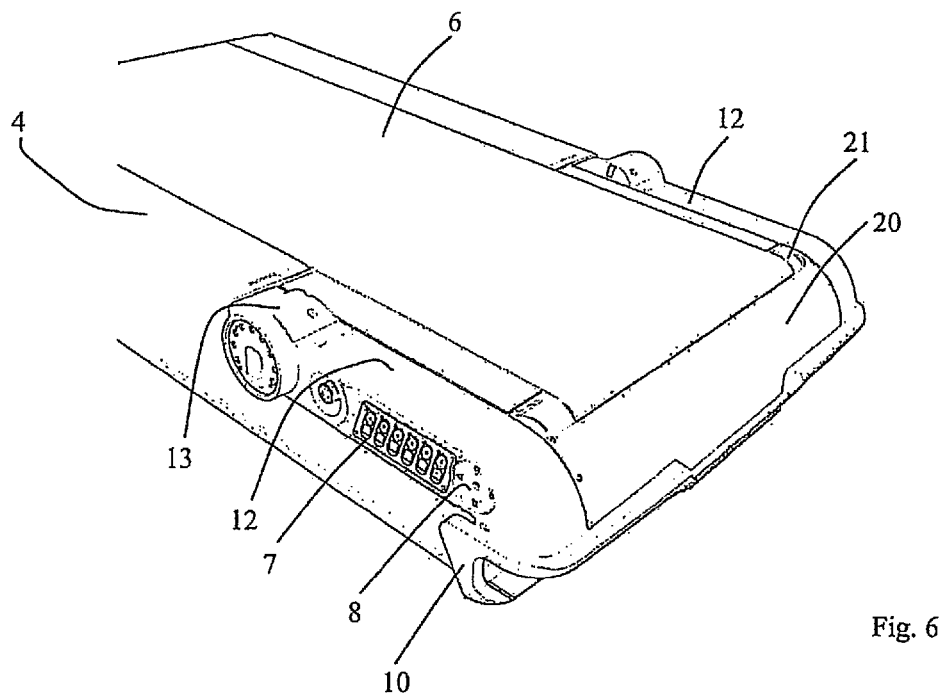
FIG. 6 is a perspective view of the modular front end portion in the unloading configuration.

At the outmost section 4 the extendable conveyor 1 has a modular front end portion 5, which is shown in FIGS. 2 and 3 in a loading configuration and in FIGS. 4 to 6 in an unloading configuration.

The modular front end portion 5 is located in an end area of the upper side of the outmost section 4 where typically loading and unloading of articles is done.

Loading Configuration (FIGS. 2 and 3)

In the loading configuration the modular front end portion 5 is configured such that the belt 6 does not extend to the outmost end of the outmost section 4, but ends spaced apart therefrom. The belt 6 is guided over a reversing roller 21 located at the beginning or innermost end of the modular front end portion 5.

Next to the end of the belt 6, three pop-out rollers 16 are located such that articles which are conveyed by the belt 6 can roll over or across the pop-out rollers 16 and onto a loading plate 11 which is located next to the pop-out rollers 16. The pop-out rollers 16 each have pivot pins 32 on each side of the longitudinally extending pop-our rollers 16 around which each one of the pop-out rollers 16 can pivot. The pivot axis of the pop-out rollers 16 extends transversely to the longitudinal axis of the extendable conveyor.

On each side of the outmost section 4 the modular front end portion 5 has a side bar 31 which is adapted to carry the components of the loading and unloading configuration of the modular front end portion 5. For example, each side bar 31 has grooves 33 for engaging with each pivot pin 32 of the pop-out rollers 16, thereby pivotally coupling the pop-out rollers 16 to each side bar 31. The grooves 33 in the side bars 31 are such positioned that the single pop-out rollers 16 are equally spaced and are parallel relative to each other positioned in the modular front end portion 5. Moreover, the grooves 33 are such configured that the pop-out rollers 16 can also be removed from the grooves 33 as it is done for configuring the modular front end portion 5 into the unloading configuration (see also below).

Underneath the pop-out rollers 16, a debris tub 15 is located such that dirt, which is transported by the belt 6 and the articles conveyed by the belt, can fall through spaces between the single pop-out rollers 16 downwardly into the debris tub 15. The debris tub 15 has a width which basically corresponds to the width of all pop-out rollers 16 and has a similar length as the pop-out rollers 16 (e.g., length is referred to the longitudinal axis of the extendable conveyor and width is referred to the width of the extendable conveyor). The debris tub 15 is supported by a support bar 34a, which connects the two side bars 31 to each other. The pop-out rollers 16 together with the debris tub 15 can be removed. By collecting dirt in the debris tub 15 and periodically removing and cleaning it, the dirt is prevented or restricted from getting into the extendable conveyor 1, and, in particular, into the modular front end portion 5. As a result, malfunction of the extendable conveyor 1 and, in particular, of the modular front portion 5 due to dirt can be avoided of significantly reduced, which might otherwise occur, for example, due to dirt in the belt conveying mechanism and/or dirt in electric connections within the extendable conveyor 1.

Next to the transfer and deceleration area formed by the pop-out rollers 16, a loading plate 11 is located at the front end of the modular front end portion 5, and, thus, also at the front end of the outmost section 4. The loading plate 11 has a plate portion that is substantially flat, a rounded transition portion and a vertical portion, such that the loading plate 11 extends horizontally in the plate portion and next to the pop-out rollers 16 and also extends vertically on the front of the outmost section 4. Thus, articles conveyed by belt 6 in the direction of the modular front end portion 5 are decelerated by rolling over or across the pop-out rollers 16, and the article onto the loading plate 11 from where it can be easily picked up by personnel for loading it, e.g. into a truck container.

On the front side of the outmost section 4, the modular front end portion 5 has a safety bumper 10 including two front lights 18 on a left side and right side. When safety bumper 10 abuts against an obstacle, the extension of the extendable conveyor 1 is automatically stopped. Moreover, the safety bumper 10 is round-shaped in order to reduce the risk that a personnel working at the outmost section is injured.

On each side bar 31, a sidepart 12 is connected and adapted for controlling the extendable conveyor. The sidepart 12 has a keyboard 7 and a navigation pad 8 for controlling movement of the belt 6 and of the whole extendable conveyor 1 as well as of other controllable functions, such as switching on/off front lights 18, etc. The sidepart 12 is mechanically connected to the side bars 31 and, moreover, electrically to an internal electric and data bus system of the extendable conveyor 1, e.g. a modbus.

Each sidepart 12 has a multiconnector 14 which is located within a multiconnector portion 13 of the sidepart 12. The multiconnector 14 is adapted to be connected with electrical components, such as lighting, an air blower or the like, and is adapted to be connected with mechanical components, such as a lift system for lifting heavy articles onto the belt 6. Thus, in this example, the multiconnector 14 has a double function—it serves both as a mechanical connector and as an electrical connector. For the lighting and the air blower, the multiconnector 14 provides a fastening point and simultaneously provides an electrical connection in order to supply electric power. For the lift system, for example, it serves only as a mechanical fastening point in some examples.

On the lower side of the outmost section 4, a safety cover 9 is located. Moreover, on the lower side a floor light is located (see FIG. 4), which has a LED lens cover 26, a LED lamp 25 and a LED reflector 24. The reflector 24 together with the plate-shaped lens cover 26 forms a housing in which the LED lamp 25 is located.

The reflector 24 has a triangular cross section and a longitudinal axis that is parallel to the longitudinal axis of the outmost section 4. Due to the triangular cross section of the reflector 24, light from the LED lamp 25, which is reflected by the reflector, is expanded transversally to the longitudinal axis of the reflector 24 such that an area underneath the outmost section 4 is evenly illuminated. Moreover, as the LED lamp 25 is parallel with its longitudinal axis to the longitudinal axis of the reflector 24, the light from the LED lamp 25 is mainly distributed transversely relative to the longitudinal axis of the LED lamp 25, and, thus, mainly transversely relative to the longitudinal axis of the outmost section 4. The lens cover 26 has a plate-like shape and enhances the equal distribution of light rays originating from the LED lamp 25.

The two front lights in the safety bumper 10 each have a LED lamp 19 and a LED lens cover 18. A single LED reflector 17 is formed such that it can engage an inner side of the safety bumper 10 and such that the LED lens covers 18 can engage respective openings within the reflector 17.

The LED lamps 19 are located within the respective LED lens covers 18, when the front lights are assembled together. The LED lens covers 18 each are such shaped that they form a housing for each of the two LED lamps 19.

The reflector 17 has an L-shaped cross section, such that light from the LED lamps 19 is reflected in a downward and forward direction. Thus, an area in front of and below the front side of the outmost section 4 is illuminated by the front lights. This is useful, for example, when the outmost section 4 is moved into a typically dark place, such as a cargo container or the like. In such cases, the front lighting illuminates the surrounding working area of the outmost section 4, thereby making the working area more comfortable and safer, since obstacles, sharp edges, and the like, can easily be seen by personnel working in the illuminated working area.

The floor light and the front lights are operated by a common LED driver 27 connected with a light sensor 28. In the case that ambient light surrounding the light sensor 28 has a light strength below a predefined value, the light sensor 28 detects such light strength and the floor and front lights are automatically switched on (and, vice versa, in the case that the light strength exceeds the predefined value the lights are switched off).

Unloading Configuration (FIGS. 4 to 6)

To configure the unloading configuration (FIGS. 4 to 6) of the modular front end portion 5, the pop-out rollers 16 are removed together with the debris tub 15.

A shock absorbing system with a shock absorbing plate 23 and four shock absorbers 22 is basically located in the place of the modular front end portion 5 where the pop-out rollers 16 and the plate portion of the loading plate 12 are located in the loading configuration. Two of the four shock absorbers 22 are each located on the support bars 34*a* and 34*b* connecting the side bars 31 to each other. The two support bars 34*a* and 34*b* are parallel to and spaced apart from each other. The first support bar 34*a* is further away from the end of the modular front end portion 5 than the second support bar 34*b* which is closer to the end of the modular front end portion. The reversing roller 21 engaging the belt 6 is moved from the loading position (FIGS. 2 and 3) into the unloading position (FIG. 6) within the modular front end portion 5 such that the belt 6 extends to the end of the outmost section 4 and over the shock absorbing plate 23.

The reversing roller 21 has a pivot pin 29 on each side and each side bar 31 has a groove 30 on its inner side such that the pivot pins 29 of reversing roller 21 can engage into the grooves 30 in the unloading position. The grooves 30 are shaped such that the pivot pins 29 abut against a projection when the reversing roller 21 is retracted. Thus, the tension of the belt 6 forces the pivot pins 29 against the projection of the grooves 30 such that the reversing roller 21 is held within the grooves 30.

In some examples, the belt 6 is guided over an additional reversing roller in the loading configuration in order to provide a spare belt. The spare belt is used after removing the additional reversing roller to extend the belt 6 to the front side of the outmost section 4, as discussed.

The front of the outmost section 4 and of the reversing roller 21 engaging the belt 6 is covered by a front plate 20 in order to close a space under the belt 6 being guided around the reversing roller 21 to hinder personnel from putting hands into the space, thereby reducing the risk of injury.

In the unloading configuration, the belt 6 extends nearly to the end of the outmost section 4 over the shock absorbing plate 23 such that articles can be easily put or thrown onto the belt 6 when unloading, e.g. a truck container. The shock absorbing plate 23 absorbs shocks caused by (heavy) articles falling onto the belt 6 in the region of the shock absorbing plate 23.

Thus, by configuring the modular front end portion in a loading or unloading configuration, the loading and unloading, respectively, is made comfortable, since in the loading situation the articles wait for pick-up on the loading plate, while in the unloading situation articles can be positioned onto the belt 6 which extends to the end of the outmost section 4 and is therefore easily reachable.

The examples explained above can also be combined with each other.

In some examples an extendable conveyor for conveying articles comprises a base unit, at least one mechanically extendable section supported in a cantilevered manner and selectively positionable relative to the base unit, and a conveying surface for conveying articles extending at least partially on an upper side of the at least one mechanically extendable section. One of the at least one mechanically extendable section is an outmost mechanically extendable section, and the outmost mechanically extendable section includes a modular front end portion that is selectively configurable to incorporate a loading set or an unloading set.

In some examples, an extendable belt conveyor for conveying articles comprises a base unit, at least one mechanically extendable section supported in a cantilevered manner and selectively positionable relative to the base unit, and a conveying surface including a belt for conveying articles extending at least partially on an upper side of the at least one mechanically extendable section. One of the at least one mechanically extendable section is an outmost mechanically extendable section including a modular front end portion and the belt is guided over a reversing roller located in the modular front end portion. The modular front end portion is selectively configurable to carry the reversing roller in a loading position or in an unloading position, wherein the reversing roller is located closer to the outmost end of the outmost mechanically extendable section in the unloading position than in the loading position.

It is noted that this patent claims priority from European Patent Application Serial Number 12 001 401.4, which was filed on Mar. 1, 2012, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An extendable conveyor for conveying articles, said conveyor comprising:
    a base unit;
    a mechanically extendable section supported in a cantilevered manner and selectively positionable relative to the base unit; and
    a conveying surface to convey articles, the conveying surface extending at least partially on an upper side of the mechanically extendable section, wherein the mechanically extendable section is an outmost mechanically extendable section including a modular front end portion that is selectively configurable to incorporate at least one of a loading set or an unloading set, wherein the conveying surface is to be spaced apart from the end of the outmost mechanically extendable section in a loading configuration of the modular front end portion and to extend to the end of the outmost mechanically extendable section in an unloading configuration of the modular front end portion.

2. The extendable conveyor of claim 1, wherein the loading set includes at least one of a loading plate, a debris tub and a roller.

3. The extendable conveyor of claim 1, wherein the unloading set includes at least one of a front plate and a shock absorbing system.

4. The extendable conveyor of claim 3, wherein the shock absorbing system comprises a shock absorber.

5. The extendable conveyor of claim 1, wherein the modular front end portion includes a safety bumper.

6. The extendable conveyor of claim 1, wherein the modular front end portion comprises a side bar to carry at least portions of the loading set or the unloading set.

7. An extendable conveyor for conveying articles, said conveyor comprising:
    a base unit;
    a mechanically extendable section supported in a cantilevered manner and selectively positionable relative to the base unit; and
    a conveying surface to convey articles, the conveying surface extending at least partially on an upper side of the mechanically extendable section, wherein the mechanically extendable section is an outmost mechanically extendable section including a modular front end portion that is selectively configurable to incorporate at least one of a loading set or an unloading set, wherein the modular front end portion is to carry a side part including an input to control the extendable conveyor.

8. The extendable conveyor of claim 7, wherein the side part is to receive a multi-connector to connect at least one of lighting, an air blower or a lift arrangement.

9. An extendable conveyor for conveying articles, said conveyor comprising:
    a base unit;
    a mechanically extendable section supported in a cantilevered manner and selectively positionable relative to the base unit; and
    a conveying surface to convey articles, the conveying surface extending at least partially on an upper side of the mechanically extendable section, wherein the mechanically extendable section is an outmost mechanically extendable section including a modular front end portion that is selectively configurable to incorporate at least one of a loading set or an unloading set, wherein the conveying surface includes a belt, the belt is guided over a reversing roller located in the modular front end portion, and the modular front end portion is to carry the reversing roller in a loading position and in an unloading position.

10. An extendable belt conveyor for conveying articles, the conveyor comprising:
    a base unit;
    a mechanically extendable section supported in a cantilevered manner and selectively positionable relative to the base unit; and
    a conveying surface including a belt to convey articles extending at least partially on an upper side of the mechanically extendable section;
    wherein one of the mechanically extendable section is an outmost mechanically extendable section including a modular front end portion, the belt is guided over a reversing roller located in the modular front end portion, and the modular front end portion is to selectively carry the reversing roller in at least one of a loading position or an unloading position, the reversing roller being located closer to the outmost end of the outmost mechanically extendable section in the unloading position than in the loading position.

11. The extendable belt conveyor of claim 10, wherein the modular front end portion is to support at least one of a loading set or an unloading set.

12. The extendable belt conveyor of claim 10, wherein the loading set includes at least one of a loading plate, a debris tub and a roller.

13. The extendable belt conveyor of claim 10, wherein the unloading set includes at least one of a front plate and a shock absorbing system.

14. The extendable belt conveyor of claim 10, wherein the conveying surface is spaced apart from the end of the outmost mechanically extendable section in a loading configuration of the modular front end portion and extends to the end of the outmost mechanically extendable section in an unloading configuration of the modular front end portion.

15. The extendable belt conveyor of claim 10, wherein the modular front end portion is to carry a side part including an input to control the extendable conveyor.

16. The extendable belt conveyor of claim 15, wherein the side part is to receive a multi-connector to connect at least one of lighting, an air blower, or a lift arrangement.

17. The extendable belt conveyor of claim 10, wherein the modular front end portion is to carry a safety bumper.

18. The extendable belt conveyor of claim 10, wherein the modular front end portion comprises a side bar to carry at least parts of the loading set or the unloading set.

\* \* \* \* \*